United States Patent
Terlutter

[19]

[11] Patent Number: 5,949,420
[45] Date of Patent: Sep. 7, 1999

[54] PROCESS FOR PRODUCING SPATIALLY EFFECTIVE IMAGES

[76] Inventor: Rolf Terlutter, Am Brinkkamp 10, D-32545 Bad Oeynhausen, Germany

[21] Appl. No.: 08/737,456

[22] PCT Filed: May 10, 1995

[86] PCT No.: PCT/EP95/01774

§ 371 Date: May 16, 1997

§ 102(e) Date: May 16, 1997

[87] PCT Pub. No.: WO95/31795

PCT Pub. Date: Nov. 23, 1995

[30] Foreign Application Priority Data

May 13, 1994 [DE] Germany ............... 44 16 935

[51] Int. Cl.$^6$ ..................................... G06F 15/00
[52] U.S. Cl. ................ 345/419; 345/439; 348/42; 348/59
[58] Field of Search ............... 345/419, 439; 348/42, 59

[56] References Cited

U.S. PATENT DOCUMENTS

| | | | |
|---|---|---|---|
| 4,959,641 | 9/1990 | Bass et al. | 345/139 |
| 5,036,385 | 7/1991 | Eichenlaub . | |
| 5,099,320 | 3/1992 | Allio . | |
| 5,751,927 | 5/1998 | Wason | 345/419 |
| 5,764,231 | 6/1998 | Ray et al. | 345/419 |

FOREIGN PATENT DOCUMENTS

| | | |
|---|---|---|
| 0583766 | 2/1994 | European Pat. Off. . |
| 4123895 | 1/1993 | Germany . |

OTHER PUBLICATIONS

"Jüngste NHK–Arbeiten zum Thema 3D", *Fernseh–und Kino–Technik*, No. 5/1992, pp. 343–345.

"Dreidimensonal ohne Brille", *Fnkschau Fernsehen*, No. 2/1987, pp. 36–39.

Primary Examiner—Mark K. Zimmerman
Assistant Examiner—Motilewa Good-Johnson
Attorney, Agent, or Firm—Rothwell, Figg, Ernst & Kurz, p.c.

[57] ABSTRACT

Process for producing spatially effective images of three-dimensional objects on a two-dimensional image-reproduction medium according to the principle of parallax panoramagrams by means of a lens array, is hereby characterized in that a two-dimensional image of the object is calculated for a specific central view direction on the basis of stored data on the three-dimensional structure of the object and that the positions of frame elements (E) of the panoramagram in the raster of the lens array are calculated for each image element of the calculated image for several different directions of view around the central direction of view and the frame elements are displayed at the calculated positions on the image-reproduction medium.

7 Claims, 11 Drawing Sheets

PERIOD
OF THE
ARRAY

E

PROCESS FOR PRODUCING SPATIALLY EFFECTIVE IMAGES

The invention concerns a process for producing spatially effective images of three-dimensional objects.

It is known that the impression of spatial depth can be perceived even on a two-dimensional image-reproduction medium, for example, a printed sheet of paper or an image screen, by presenting a so-called parallax panoramagram on the image-reproduction medium, which is then observed by an an array of lenses arranged directly in front of the image plane. The parallax panoramagram is a planar representation of the three-dimensional object, which is comprised of several partial images [frames] interleaved corresponding to the lens raster. Each frame shows the object from a somewhat different direction of view, so that the parallactic shift of the parts of the object through all of the frames is reproduced with observation from different directions of view.

The lens array serves for the purpose of optically separating the frames from one another, so that each time only the frame belonging to a specific direction of view can be recognized upon observation from this direction of view. For this purpose, the lens array is arranged in front of the panoramagram in such a way that the focal plane of the lenses essentially coincides with the image plane. The light passing from an individual point in the image plane is then refracted by the lenses in an essentially parallel beam bundle, which forms a specific angle with the normal line of the image. A virtual image of this point can thus only be recognized if the panoramagram is observed at this angle. The angle between the direction of view and the image normal line is determined according to laws of geometric optics by the distance between the observed point and the optical axis of the respective lens. The desired assignment between frames and directions of view can be achieved by arranging the elements in suitable positions with respect to the lens raster.

In practice, for the most part, operation is conducted with a lens array of vertically running cylindrical lenses, and the observation angle is varied in the horizontal direction, so that the different parallaxes are reproduced particularly for the left and right eyes of the observer and thus the impression of spatial depth arises.

The conventional process for producing such parallax panoramagrams consists of the fact that the object to be displayed is photographed from different directions of view, whereby the lens array is arranged directly in front of the photographic film. The image of the object is thus focused for each individual photo by the cylindrical lens into a family of parallel strips, which represent the respective frame. The frames for the remaining directions of view are produced in a series of successive photos in the intermediate spaces between these strips. If the developed film is later observed by the same or an identical lens array, one perceives a spatial image of the object.

It is proposed in Funkschau 2/1987, pages 36 to 39, to utilize the above-described principle for three-dimensional television image reproduction. For this purpose, the frames of the panoramagram produced by television cameras are projected on the receiver side onto a large image screen with several projectors, and this screen is provided with a lens array.

Apart from the above-mentioned planned application in the field of television technology, practical applications of the parallax panoramagram have been limited essentially to picture postcards and joke or novelty items.

The object of the invention is to indicate a process for producing spatial images, by means of which the interpretation of construction drawings is facilitated for the technician or designer [architect], such drawings being produced, for example, by means of CAD systems.

This task is resolved according to the invention with the features indicated in the independent patent claims.

The basic concept of the invention consists of the fact that a synthetic parallax panoramagram, which is created on the basis of data, for example, produced by means of a computer and electronically stored, which establish the three-dimensional structure of the object, and this panoramagram can then be displayed on a high-resolution image screen or printed by means of a high-resolution printer and can be observed by a corresponding lens array.

An essential advantage of this process consists of the fact that the electronically stored data can be converted directly into a spatial image, without the necessity of preparing a real three-dimensional model for this purpose. This particularly offers the advantageous possibility of representing structures three-dimensionally that are concealed inside the object.

The resolution of the three-dimensional image is determined by the raster of the lens array. The resolution capacity of the image-reproduction medium used should amount to a multiple of this resolution, and thus a corresponding number of frames can be reproduced. However, the resolution that can be obtained with today's laser printers or ink-jet printers suffices for a display of three-dimensional images with a sufficiently fine lens raster. Certain losses in image resolution are more than compensated for by the fact that the observer can create, upon one glance, a direct impression of the spatial structure of the object. In this way, the interpretation of two-dimensional images also available is essentially simplified. This [immediate comprehension] particularly applies to the perspective display of objects with a great many details, since it faciliates the spatial impression for the observer, by structuring the many complex lines by distinguishing foreground and background.

The process can be applied without problem also in the case of multicolor displays, whereby the clarity is further increased.

The number of synthetically produced frames amounts to at least two, corresponding to the parallaxes between the left and the right eye of the observer, but it may also be essentially higher, so that the observer perceives an almost continuous parallax shift upon moving the head. In an array of cylindrical lenses, this applies only to lateral head motions, but an array of lattice or honeycomb-shaped spherical lenses may also be used, so that different parallaxes may also be presented in the vertical direction.

The term "frame" is not to be understood in this connection as a frame that must represent a complete view of the entire three-dimensional object, if this is observed from a specific direction of view; rather, the term "frame" designates a two-dimensional representation of a specific section or element of the three-dimensional object for a specific direction of view. For example, a three-dimensional line element of the object is transformed into several two-dimensional line elements (frames), each of which corresponds to a specific direction of view. Formulated in somewhat more general terms, each three-dimensional graphic vector, which represents a specific detail of the object, is transformed into a number of two-dimensional graphic vectors, which are each assigned to another direction of view.

This process can be conducted with a small apparatus expenditure, since only the lens array (e.g., a foil) and software specific for the purpose are necessary, in addition to a computer and a high-resolution printer, in order to conduct this process.

Advantageous further improvements and configurations of the process can be derived from the subclaims.

A particular advantage of the process consists of the fact that the number of different directions of view and thus the number of frames to be produced are not needed to be established uniformly for the entire image. Thus it is possible to provide a relatively high number of frames for parts of the object, which undergo a high parallactic shift, so that sudden transitions of more than one pixel (more than one single lens) are avoided upon changing the observation position, whereas for [other] parts of the object, which are found in the vicinity of the conceived center of rotation (target point of view) and thus experience only a small parallactic shift, only a small number of frames is produced, so that the computation expenditure is minimized and the frame elements can be clearly resolved with the printer.

For calculating the panoramagram of an object, which is defined by a number of vectors in a pregiven three-dimensional coordinate system, one preferably proceeds from the idea that the observer is found at a specific site at a finite distance from the object and then his position of observation is varied, whereby the glance remains directed continually on a specific target point of view. The central observation position and the target point are established according to the preliminary data of the user in the given coordinate system and determine the central direction of view.

It is appropriate to convert to a Cartesian coordinate system by means of a coordinate transformation $T_{view}$, whose origin will lie in the target point of view and this is rotated such that a coordinate axis, particularly the z axis, is directed onto the central observation position and the other two axes run in the width and height direction of the two-dimensional image-reproduction medium. Changes in the direction of view corresponding to the variation of the observation position can then be described by rotations around a small angle $\beta$ around the vertical axis of the transformed coordinate system. The corresponding rotational transformations are designated as $T^{\beta}_{parallax}$ in the following. The thus-obtained three-dimensional vectors corresponding to the desired perspectives are projected into the view plane by another transformation $T_{2d}$ and positioned in a pre-given view window of the image-reproduction medium.

Depending on the configuration of the lens array, it is theoretically conceivable that one and the same point in the image plane may be observed by several adjacent lenses of the lens array (each at another angle of observation). In the simplest case, the lens array is configured, however, such that a virtual image is produced from each image point only by a single lens lying directly above it. The maximum distance from the image point of the optical axis of the respective lens is then limited by the period of the lens raster. Thus, the maximum angle between the direction of observation and the image normal line is limited to a value of $\pm\beta_{parallax}$. In this case, therefore, only angles within the interval $[-\beta_{parallax}, +\beta_{parallax}]$ can be drawn on for the rotational transformations $T^{\beta}_{parallax}$.

In a typical case of application, one may conceive of the three-dimensional object to be presented, for example, as a wire grid model of straight line elements. The beginning and end points of the line elements are then given by the above-named vectors. In this case, the panoramagram is calculated preferably for individual line elements, one after the other. For each line element, the optimal step width $\Delta\beta$ is first determined for the variation in the direction of view within the above-named interval. The determining parameters for this are the periods of the line raster and the extent of the parallactic shift, which the line element experiences in changing the direction of view. This parallactic shift may be estimated on the basis of the distance between the end point of the line element and the target point of view.

Depending on the position of the line element in space, the end points of the planar projection generally show parallactic shifts of different magnitudes. The ideal step width $\Delta\beta$ for the view direction $\beta$, which leads to shifts of exactly one period D of the lens array, thus varies for the site along the lens element and is dependent on its position in space and angle $\beta$ of the central view direction.

In order to simplify and accelerate the calculations, it is useful to select uniformly the step width $\Delta\beta$ for the entire line element. The step width $\Delta\beta$ should then be small, so that the parallactic shifts from one frame to another amount to a maximum lens period D for all sites on the line element. In this case, the planar projection of the line element for the view direction $\beta$ is rastered according to period D of the lens array, that is, the projection of the line element is divided into a number of segments, which correspond to the cylindrical lenses swept over by the line element. The frame of this line element belonging to a specific view direction $\beta$ thus comprises single pixels or frame elements in the form of thin line segments, which run parallel to the cylindrical lenses and are displaced opposite one another by the distance D in the direction perpendicular to this. The positions of these frame elements relative to the focal lines of the cylindrical lenses may be calculated uniformly from the respective observation angle $\beta$. The length of the frame elements in the direction parallel to the cylindrical lenses is given by the slope of the line element for the inside frame elements. A special calculation is required for the frame elements at the beginning and at the end of the line element, since here the positions of the beginning and end points relative to cylindrical lenses are also to be considered.

In an alternative form of embodiment, it is also possible to first divide the line element belonging to the central observation position ($\beta=0$) into a number of segments and then to separately calculate the step width $\Delta\beta$ for each segment. For example, it can be achieved in this way that for a line element, which begins in the vicinity of the target point of view in the three-dimensional object and extends from there into the depth of space, the resolution, i.e., the number of frames, increases from the beginning point to the end point.

If an observation position at a finite distance to the image plane is assumed, so that the lines of sight from the observer to the end points of the line element are divergent, then generally the correct positions of the frames relative to the lens array are also dependent on the thickness of the lens array. This can be considered by the fact that an apparent period D is the basis instead of the actual period of the lens array, and this is corrected corresponding to the ratio between the observation distance and the thickness of the lens array.

The process of the invention is not limited to the representation of wire grid models. For example, it is also possible to produce spatial images true to nature for invisible objects by producing only the frames of the lines for each view direction, which are visible from this direction of view.

It is also possible to present objects with colored surfaces by producing frames in the form of parallel lines in the raster of the lens array for surfaces, which are visible in the respective view direction.

An example of embodiment of the invention based on the drawings will be explained in more detail in the following.

Here:

Figure 1:
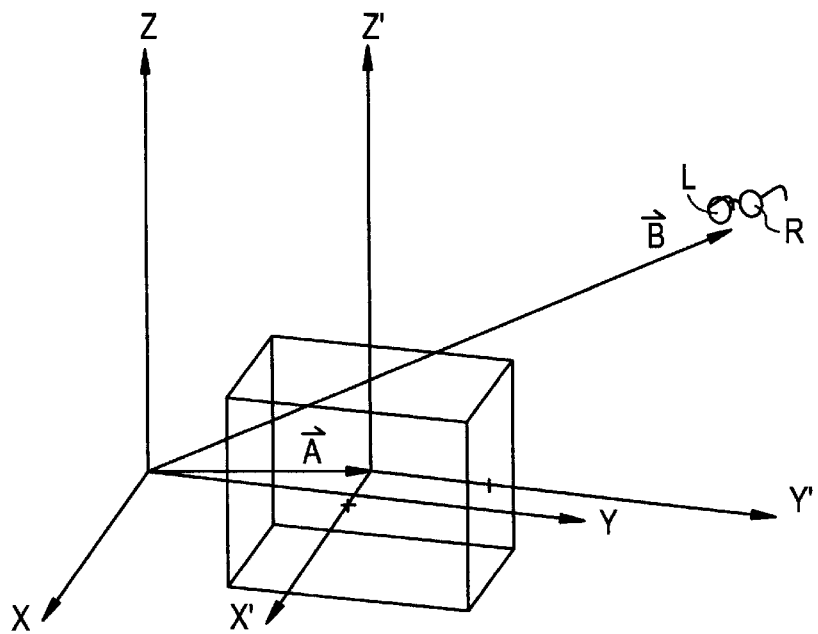
FIGS. 1 to 3 show the positions of different Cartesian coordinate systems with respect to a parallelepiped-shaped object, for illustration of a sequence of coordinate transformations.
Figure 2:
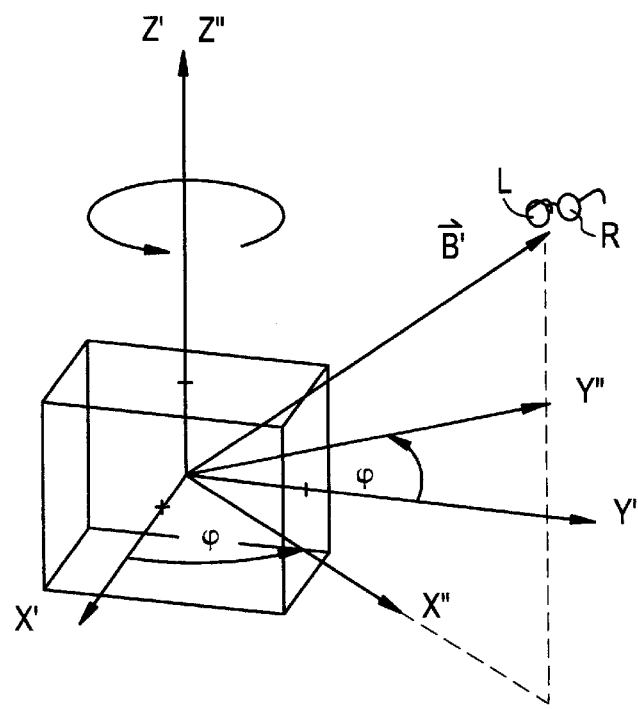

Transformations for producing a conventional view:

The calculation of graphic structures for the 3-D image assumes drawing [plan] objects, whose geometrical data can be made available in vectorial form. Almost all commercial CAD programs permit the production of drawing data, from which data can be extracted on the drawing objects and the position of the observer, in three-dimensional vectorial form.

The subsequent calculations concretely assume that all drawing objects are built up from series of straight line elements and the position vectors for the beginning and end points of the line segments are present as a triplicate data set for the position of the observer and the target point of the glance direction.

The generation of the graphic structure in the plane first requires a view of the drawing object from the site of the observer and with the intended image segment. FIGS. 1 through 5 shall reconcile the conventional shift, rotational and projection transformations on the example of a parallelepiped, and these transformations lead to a 2-dimensional view projection (FIG. 5) from a set of 3-dimensional position vectors (corner points).

FIG. 1:

Conversion of the system S(X,Y,Z) to the system S'(X', Y',Z') by shifting the origin of the coordinates to the target point of view $\vec{A}$ of the observer at site $\vec{B}$:

$$\vec{P}' = \vec{P} - \vec{A} \quad \text{for all vectors } \vec{P}$$

FIG. 2:

Conversion of the system S'(X',Y',Z') to S"(X",Y",Z") by positive rotation of the X' and Y' axes around the Z' axis by the angle φ:

The corresponding rotation of the position vectors:

$$\vec{P}'' = \begin{pmatrix} \cos\varphi & \sin\varphi & 0 \\ -\sin\varphi & \cos\varphi & 0 \\ 0 & 0 & 1 \end{pmatrix} \cdot \vec{P}'$$

Determination of φ from the components of $\vec{B}'$:

$$b'_x > 0: \quad \varphi = \arctan(b'_y/b'_x)$$

$$b'_x < 0: \quad \varphi = \arctan(b'_y/b'_x) + \pi$$

$$b'_x = 0 \text{ and } b'_y \neq 0: \quad \varphi = sgn(b'_y) \cdot \frac{\pi}{2}$$

$$b'_x = 0 \text{ and } b'_y = 0: \quad \varphi = -\frac{\pi}{2}$$

und=and; sgn=sign

FIG. 3:

Conversion of the system S"(X",Y",Z") to S'"(X'",Y'",Z'") by positive rotation of the X" and Z" axes around the Y" axis by the angle θ:

The corresponding rotation of the position vectors:

$$\vec{P}''' = \begin{pmatrix} \cos\theta & 0 & -\sin\theta \\ 0 & 1 & 0 \\ \sin\theta & 0 & \cos\theta \end{pmatrix} \cdot \vec{P}''$$

Determination of θ from the components of $\vec{B}'$:

$$b'_z > 0: \quad \theta = \arctan\left(\sqrt{b_x'^2 + b_y'^2} \Big/ |b'_z|\right)$$

$$b'_z < 0: \quad \theta = \pi - \arctan\left(\sqrt{b_x'^2 + b_y'^2} \Big/ |b'_z|\right)$$

$$b'_z = 0: \quad \theta = \frac{\pi}{2} \quad \text{(conventional)}$$

The previous transformations convert the vectors into the S'" system, by running the view direction parallel to the Z'" axis; in the following, these are combined as:

$$T_{view} : \vec{P}''' = \begin{pmatrix} \cos\theta \cdot \cos\varphi & \cos\theta \cdot \sin\varphi & -\sin\theta \\ -\sin\varphi & \cos\varphi & 0 \\ \sin\theta \cdot \cos\varphi & \sin\theta \cdot \sin\varphi & \cos\theta \end{pmatrix} \cdot (\vec{P} - \vec{A})$$

Figure 7:
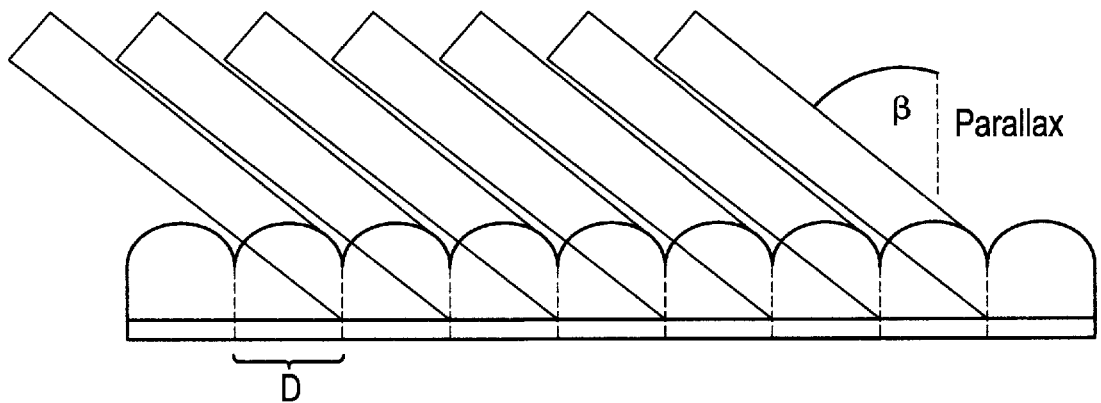

FIG. 4:

"Perspective" rotation in S'" (X'", Y'", Z'") around β: (e.g. for producing the views from the sites between the right and left eyes of the imaginary observer).

$$T^\beta_{Parallax} : \vec{P}'''_\beta = \begin{pmatrix} 1 & 0 & 0 \\ 0 & \cos\beta & -\sin\beta \\ 0 & \sin\beta & \cos\beta \end{pmatrix} \cdot \vec{P}'''$$

β from the interval $[-\beta_{parallax}, \beta_{parallax}]$ $\beta_{parallax}$: maximum angle at which the image beams of graphical structures can be deflected at the edges of the lenses (FIG. 7); a property of the lens.

FIG. 5:

Projection of the 3-dimensional vectors into the plane of view:

$$T_{2d} : \vec{P}_{2D} = \begin{pmatrix} X_{2D} \\ Y_{2D} \end{pmatrix} = \begin{pmatrix} 0 & 1 & 0 \\ -1 & 0 & 0 \end{pmatrix} \cdot \vec{P}''' + \begin{pmatrix} 0.5 \cdot RB - X_{zv} \\ 0.5 \cdot RH - Y_{zv} \end{pmatrix}$$

RB, RH: frame width, frame height of the view window.
$X_{ZV}$, $Y_{ZV}$: horizontal shift, vertical shift of the window center relative to the projection of the origin of S'''.

Perspectives other than the normal perspectives shown here require only other forms for $T_{2D}$ at this place. Other descriptions thus also remain valid.

Figure 6:
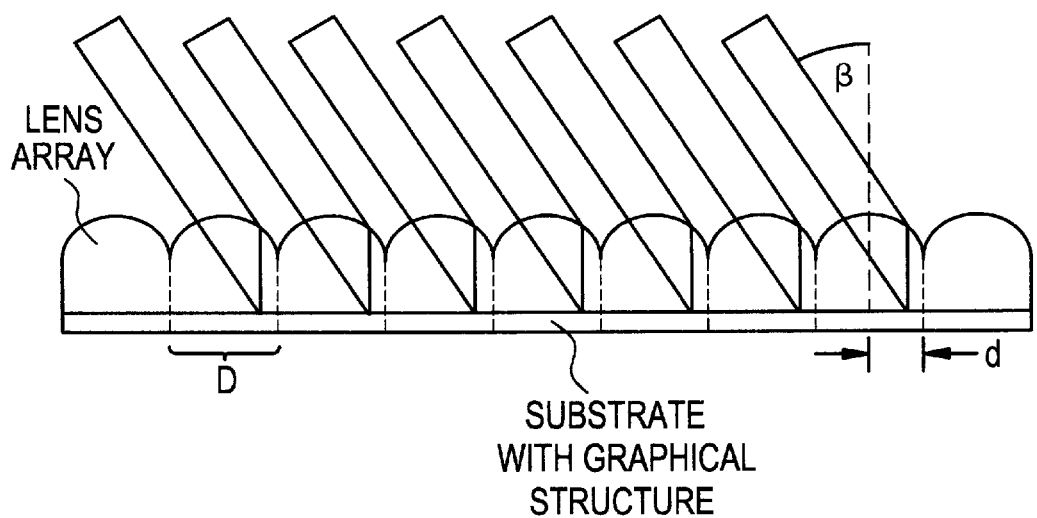
FIGS. 6 and 7 show sketches for explaining the imaging properties of a lens array.

Imaging properties of the lens array:

In order to simplify the description, the optical properties of the lens array (FIG. 6) shall be idealized such that the following relation is valid for all image points in the focal planes and their imaging:

$d = \frac{1}{2} \cdot D / \beta_{parallax} \cdot \beta$ (d proportional to β)

d: distance of the point from the center of the lens,

β: deflection of the image beam from the image normal line.

Nonlinear functions of d(β) may describe special lens properties at this place or consider lens defects and are compatible with subsequent derivations.

Figure 9:
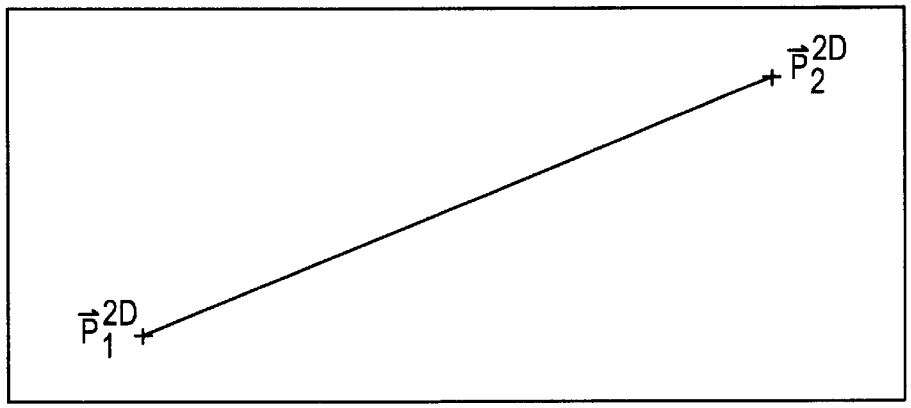
FIG. 9 shows a planar image of a line element in a view window of the image-reproduction medium.
Figure 10:
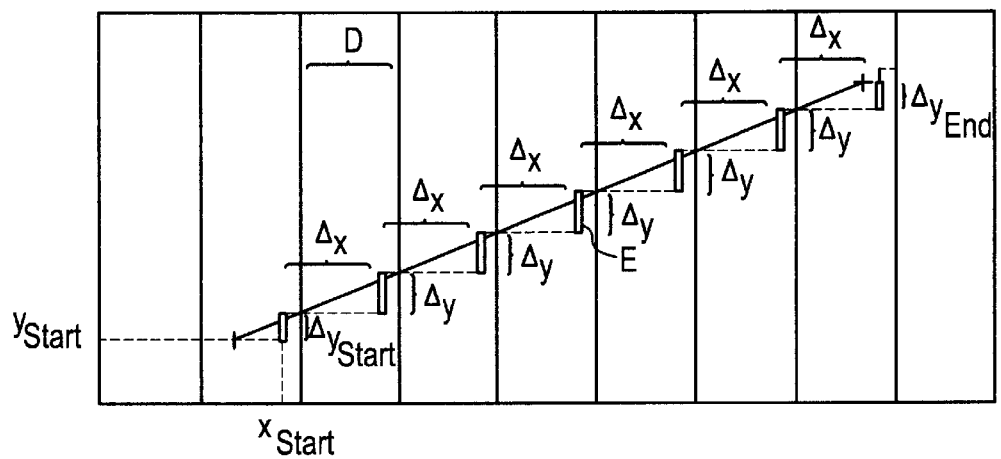
FIG. 10 shows a frame belonging to the line element according to FIG. 9, which is calculated for a specific view direction and is rastered according to the lens array.
Figure 11:
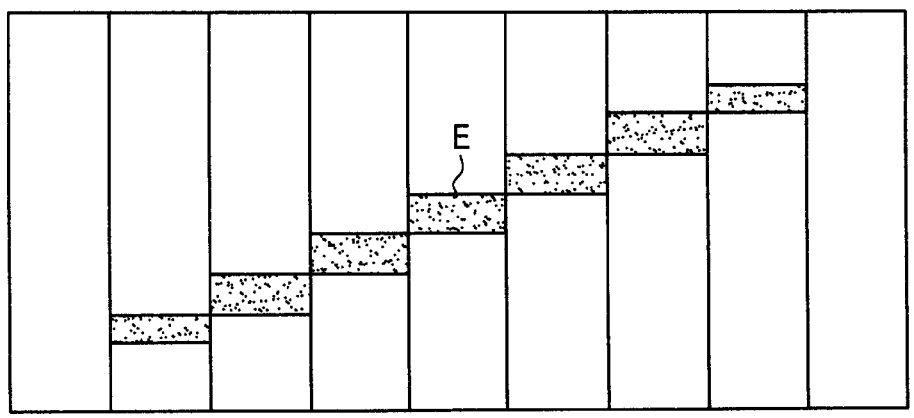
FIG. 11 shows the apparent image of the frame according to FIG. 10, if it is observed from the observation direction provided for each one through the lens array.

Operation of image production and 3-D image effect:

FIGS. 9 through 11 show the corresponding graphical structure (FIG. 10) and the final virtual image of this structure (FIG. 11) by means of an introduced cylindrical lens array for the example of a straight line element in the plane of view (FIG. 9).

The view at angle β in FIG. 9 corresponds to the vertical line elements in FIG. 10 (thick lines). The thick line segments in FIG. 10 are found in places where each cylindrical lens forms a line focus to deflection angle β. The regions of cylindrical lenses in FIG. 10 are marked by vertical lines (period D).

Figure 8:
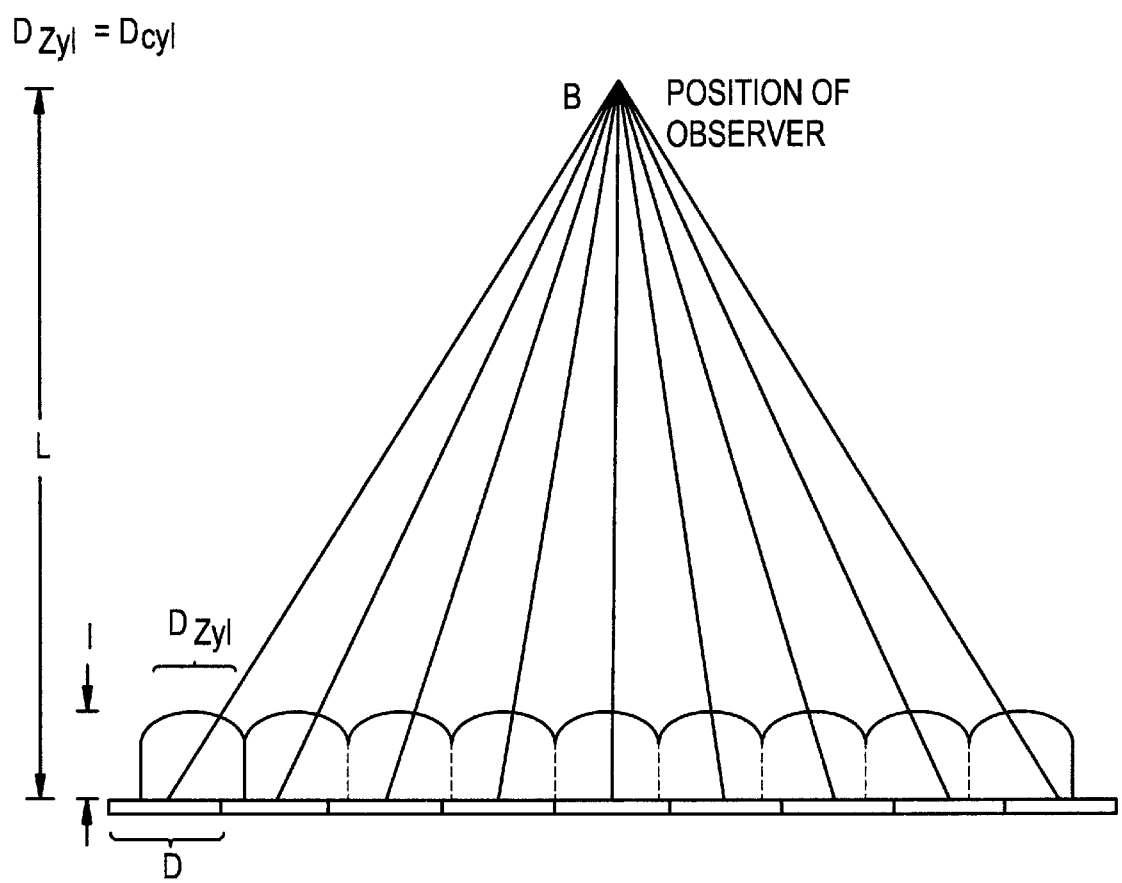
FIG. 8 shows a diagram for explaining the arrangement between individual cylindrical lenses of the lens array and respective zones of the image plane for an observer at a finite distance to the image plane.

The line segments are accurately imaged at the same angle β (FIG. 6) to the surface normal line, if the horizontal period of the line structure agrees with the lens period, and the phase d (β) describes the position of the line focus to angle β. FIG. 11 shows the image of the graphical structure through the lens array, as it appears only for observation at angle β to the array normal line, perpendicular to the vertical direction and at great distance. Brightness modulations in the line foci of the cylindrical lenses each fill the entire width of the individual lenses, so that a gapless sequence of rectangles arises on the track of the original line (FIG. 8). With sufficiently small period D of the lens array and the graphical structure, the line will again come from FIG. 9 for this image, but with the virtual horizontal pixel size D.

Different images can be modulated to different angles β for the different regions of line foci. By the selection of a special observer position at angle β to the image normal line, it is possible to again separate the individual images. The impression of a 3-dimensional view with parallax is formed, if the images show different views of the 3-dimensional object. The image to observer angle β must thus correspond to the view by migration around the vertical axis of the object by angle -β.

For a real observer position B at a finite distance L in front of the lens array, the bundle of parallel beams (FIG. 6) must be replaced by those that intersect at the site of the observer (FIG. 8). This can be obtained by an enlarged period of graphic structure D relative to period $D_{cyl}$ of the lens array. The ratio 1/L is greatly exceeded in FIG. 8. The enlarged period D of the graphical structure follows from geometrical superimpositions:

$D = D_{cyl} \cdot (1 + 1/L)$

1: thickness of the lens array=focal distance f

Figure 12:
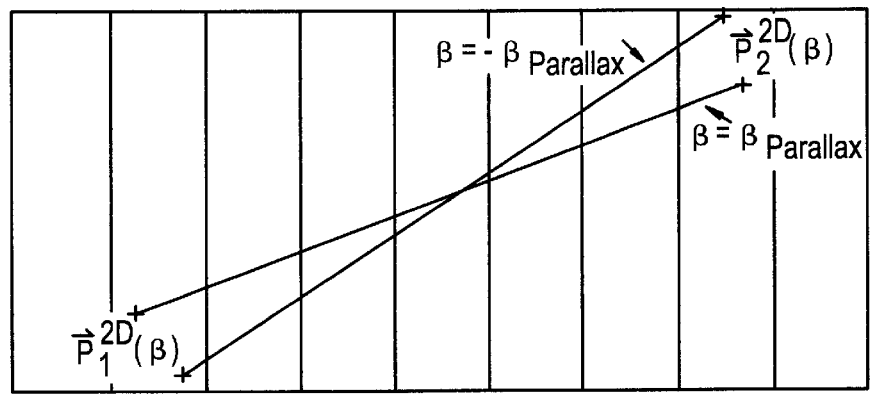
FIG. 12 shows the extreme positions of the line element according to FIG. 9 for a maximum variation of the view direction.
Figure 13:
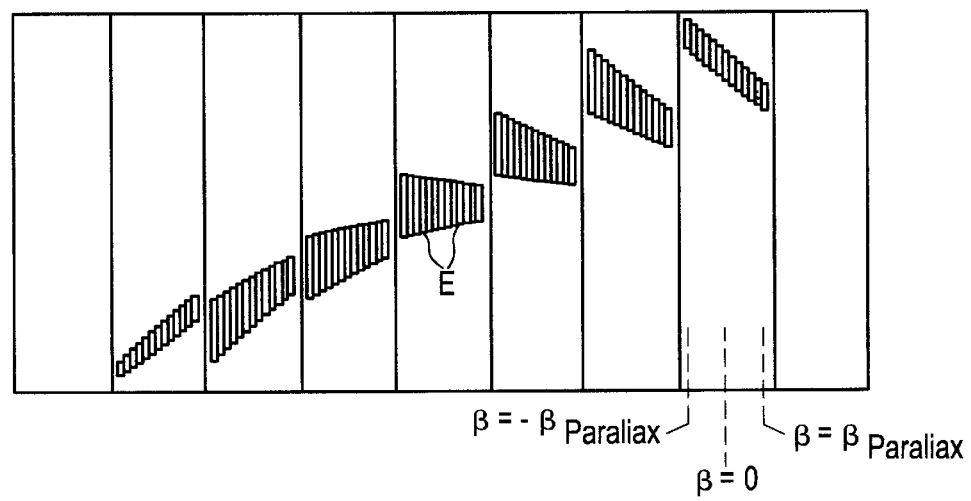
FIG. 13 shows frames of the line element corresponding to FIG. 10 for a multiple number of discrete view directions.

If, for several equidistant angles between the extreme views:

$\beta = -\frac{1}{2}\beta_{parallax}$ to $\frac{1}{2}\beta_{parallax}$ of the line (FIG. 12), the line sequences are produced analogously to FIG. 10, so that complex graphical structures are formed as in FIG. 13. In order to clarify the correlated regions, only the lines of a view β result. FIG. 14 again shows the virtual image of the structure via the lens array. The rectangles, which correspond to the view with the labeled lines in FIG. 13, again result. The other structures from FIG. 13 produce partially overlapping rectangles, whose edges can be viewed corresponding to their shift with β.

Figure 15:
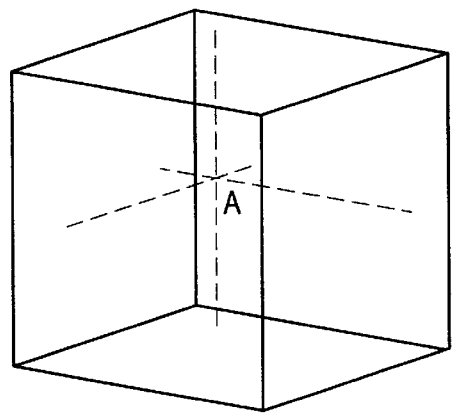
FIG. 15 shows a wire grid model of an object to be displayed in the form of a cube.
Figure 16:
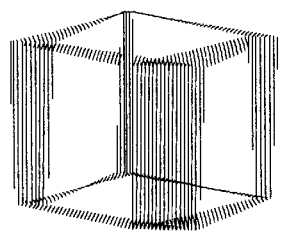
FIG. 16 shows a panoramagram of the cube according to FIG. 15 in the original size and calculated for a cylindrical lens array with a period of 0.4 mm.
Figure 17:
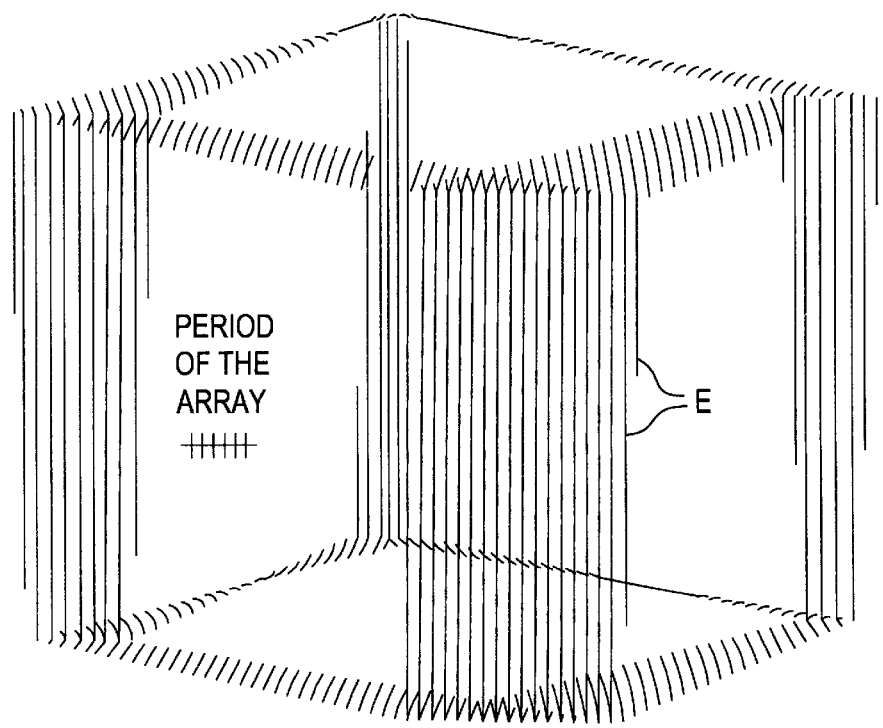
FIGS. 17 to 19 show enlarged representations of the panoramagram according to FIG. 16.
Figure 18:
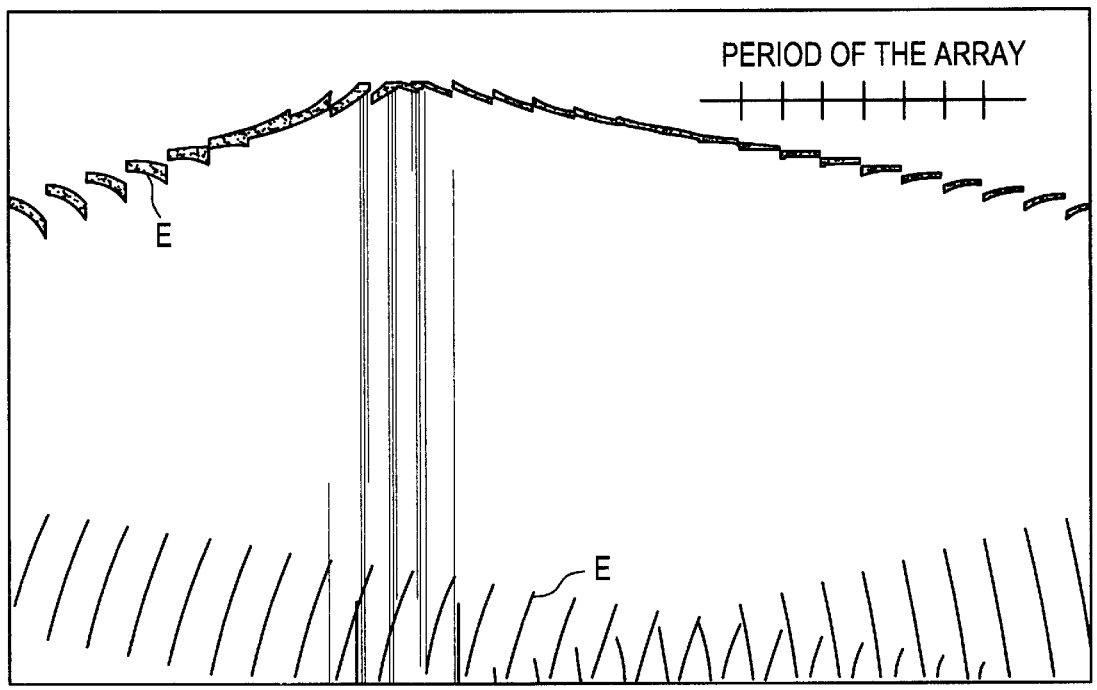
Figure 19:
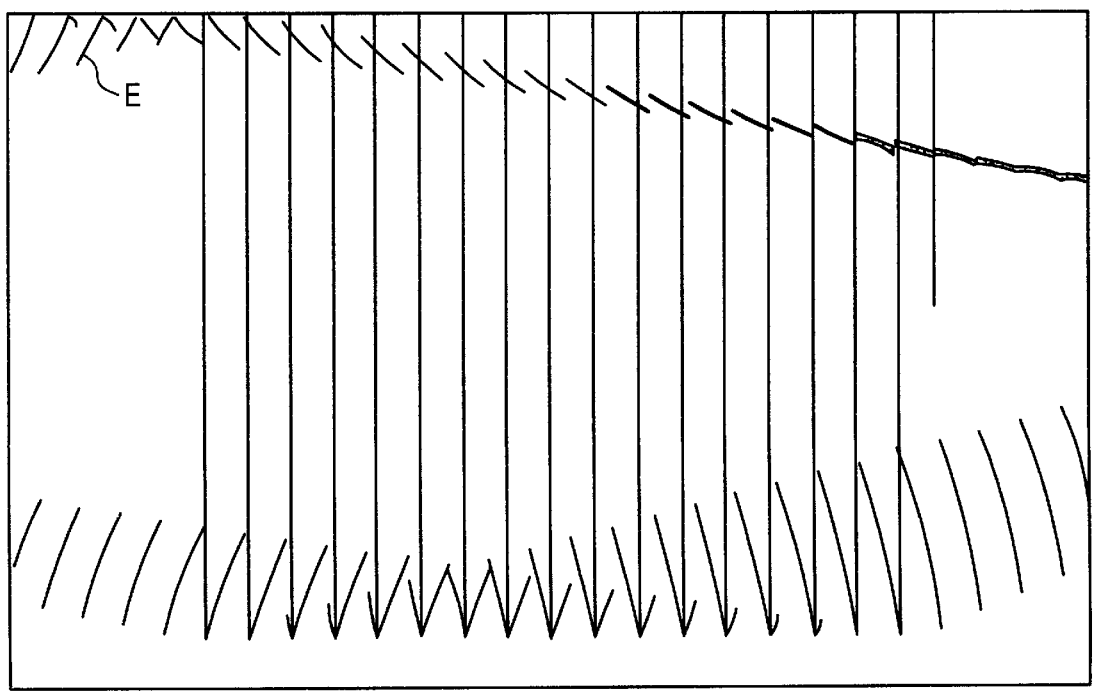

FIGS. 16 through 19 show functional graphical structures in different scales for a cube (FIG. 15). The target point A of the view is marked in FIG. 15. The structure was calculated on a scale of 1:1 (FIG. 16) for a lens array with $D_{cyl}$=0.4 mm. The typical curvilinear squares from FIG. 13 are found in the upper right region of FIG. 18 in a section of the 15 X enlargement.

Calculations for the 3-D image of a line element in space:

Situation: line element from $\vec{P}_1$ to $\vec{P}_2$ in 3-D space, observed at angle β to the central view.

With coordinates in the plane of view:

$$\vec{P}^i_{2D}(\beta) = \begin{bmatrix} X^i_{2D} \\ Y^i_{2D} \end{bmatrix} = T_{2D}(T^\beta_{Parallax}(T_{view}(\vec{P}_i))) \quad i = 1, 2$$

and with the order of $\vec{P}^1_{2D}$ and $\vec{P}^2_{2D}$ such that $X^1_{2D} \leq X^2_{2D}$:

$N_1$=all parts of D in $X^1_{2D}$ (β)

$R_1$=remainder after dividing $X^1_{2D}$ (β) by D $N_2$=all parts of D in $X^2_{2D}$ (β)

$R_2$=remainder after dividing $X^2_{2D}$ (β) by D

The magnitudes of the line sequence according to FIG. 10:

$$X_{Start} = \left(N_1(\beta) + \frac{1}{2}\right) \cdot D + d(\beta)$$

$$Y_{Start} = Y^1_{2D}(\beta)$$

$$\Delta X = D$$

$$X^1_{2D} \approx X^2_{2D} : \quad \Delta Y = D \cdot \frac{Y^2_{2D}(\beta) - Y^1_{2D}(\beta)}{X^2_{2D}(\beta) - X^1_{2D}(\beta)}$$

-continued $$X_{2D}^1 = X_{2D}^2: \quad \Delta Y - Y_{2D}^2 - Y_{2D}^1$$

$$\Delta Y_{Start} = (1 - R_1) \cdot \Delta Y$$

$$\Delta Y_{End} = R_2 \cdot \Delta Y$$

Line sequences according to FIG. 10 can be produced recurrently in a subprogram with these values. These line data are digitally stored or can be output directly onto a graphics medium.

Figure 14:
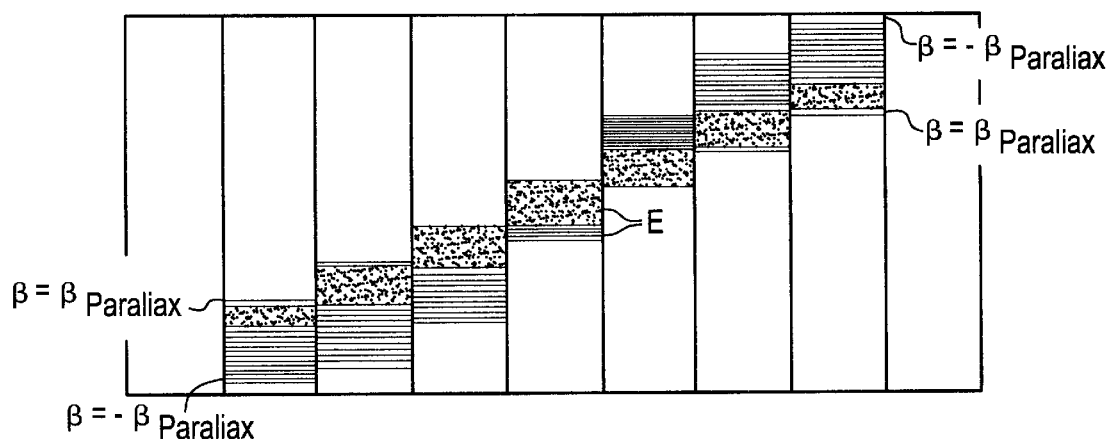
FIG. 14 shows the apparent images of the frames according to FIG. 13, if they are observed from the respective view direction through the lens array.

Step widths for the variation of views:

The end points of the lines for all views β from the region $-\beta_{parallax}$ to $\beta_{parallax}$ below the respective cylindrical lenses remain in FIG. 12. Only vertical shifts of the pixel occur in the virtual image with lens array (FIG. 14). The line sequences from FIG. 13, however, may also be shifted horizontally over several lens widths D, if the parallaxes between the extreme views of the line in FIG. 12 are larger. In each of the lens regions that is passed through, parts of the line sequences from FIG. 10 must be present, and thus the image elements continually alternate with β from lens to lens in the virtual view through the lens array.

This requirement makes necessary a limiting of the step widths for β.

An upper limit for the step width of β and for a line element from $\vec{P}_1''' = (x_1, y_1, z_1)$ to $\vec{P}_2''' = (x_2, y_2, z_2)$ is:

$$\vec{P}_1''' = (x_1, y_1, z_1) \text{ nach } \vec{P}_2''' = (x_2, y_2, z_2)$$

$$\Delta \beta = 2 \cdot \arctan\left(\frac{1}{2} \cdot \frac{D}{E}\right)$$

Figure 3:
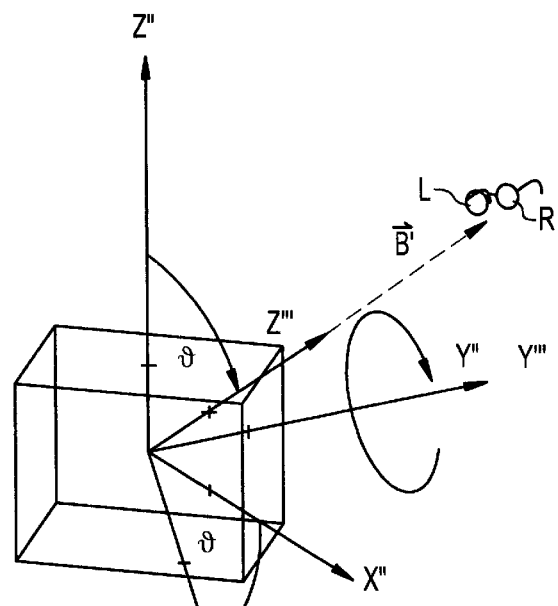
Figure 4:
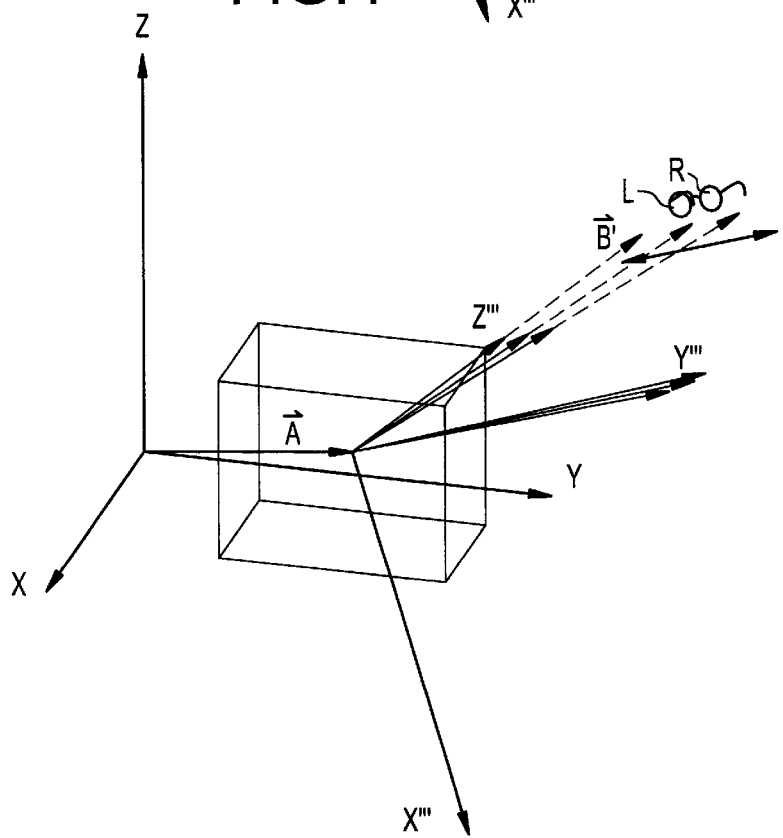
FIG. 4 shows coordinate transformations, which describe the variation of the view direction (i.e., from the site of the observer)
Figure 5:
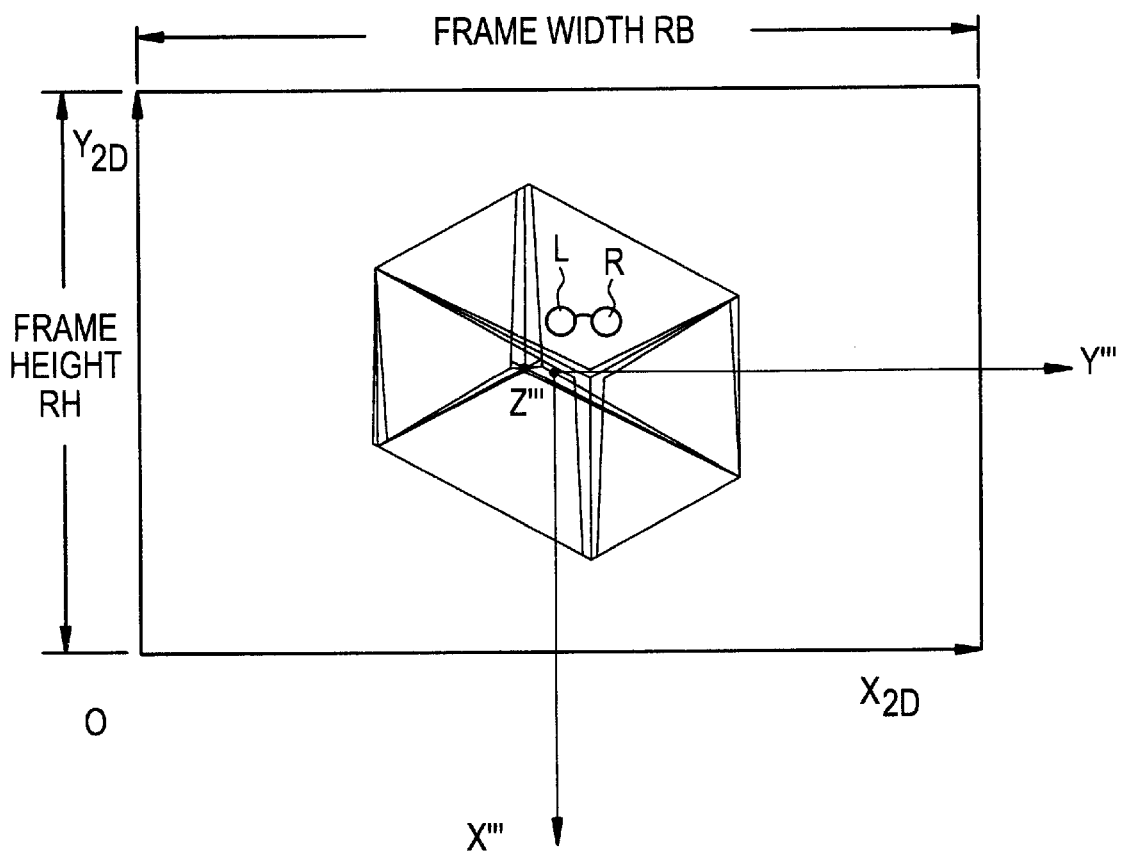
FIG. 5 shows two-dimensional images of the parallelepiped-shaped object according to FIGS. 1 through 4 for different view directions corresponding to FIG. 4.

E is the greatest distance of the line element from the axis of rotation X''' in system S''' (FIG. 3).

Step width Δβ is calculated individually for each line element of the drawing object and varies with the distance from the target point of view A. The number of views β in the interval from $-\beta_{parallax}$ to $\beta_{parallax}$ also varies with step width Δβ. Therefore, no uniform number of individual views can be assigned overall to the graphical structure.

FIGS. 15 through 19 show the graphical structure of a cube. The perpendicular edge on the side turned away in FIG. 15 leads to a smaller number of vertical lines in the section, FIG. 18, than the front vertical edge in the section, FIG. 19. Due to the greater distance of the front edge to the target point of view A and the larger parallaxes, more views and correspondingly more lines have been produced than for the back edge. In the region of the parallaxes of the cube edges, the cylinder lenses that are swept over without any gaps participate in the production of the virtual image.

Figure 20A:
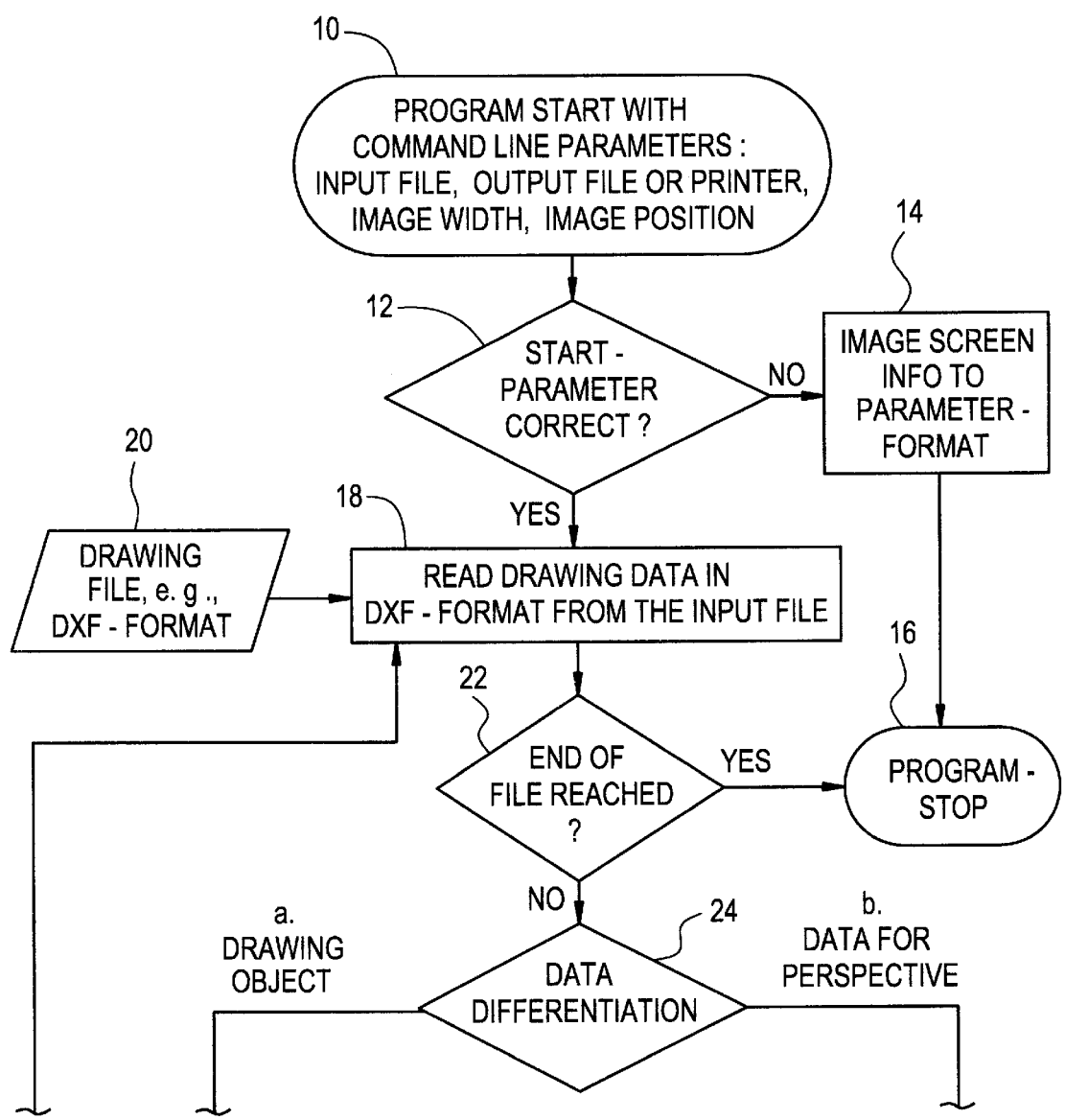
FIG. 20 shows a flow diagram in order to explain the process of the invention.
Figure 20B:
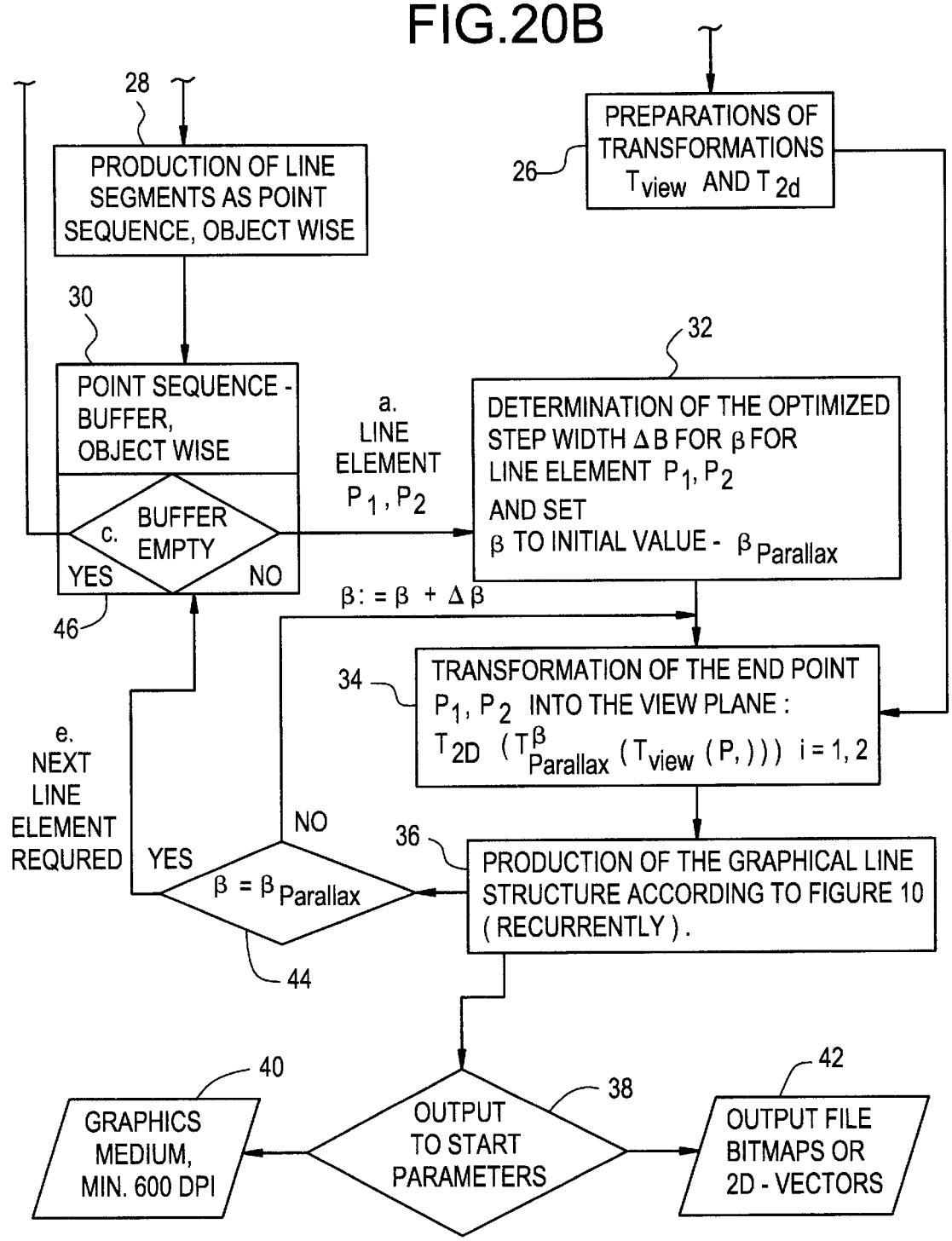

The flow diagram in FIG. 20 uses the preceding derivations and designations and describes the program for producing the graphical structures for the 3-D images.

In step 10, a program for calculating the panoramagram is called up. The user specifies which source (input file) from which the data for the three-dimensional object will be taken, and whether the calculated panoramagram will be printed directly or stored in an output file. In addition, the width and the height of the image window as well as the position of the image (of the target point of view) are also established within this window.

In step 12, a test is made of whether the program can be conducted with the parameters specified in step 10. If this is not the case, an error message is produced in step 14, and the program is terminated with step 16.

If it has been established in step 12 that the input parameters are suitable for a program run, then the first data will be read from input file 20. Input file 20 contains, on the one hand, data that indicate the three-dimensional structure of one or more drawing objects, and on the other hand, data that refer to the desired perspective display of this object.

In step 22, a test is made of whether the end of the input file has been reached. If this is not the case, step 24 distinguishes whether the data read relate to the perspective display or to the geometry of the object. Based on the data for the perspective view, the above-mentioned transformation matrices $T_{view}$ and $T_{2d}$ are prepared in step 26. The data read for the drawing objects serve for the production of line segments in step 28, and these segments are defined by the beginning and end points of individual line elements. In step 30, the corresponding point sequences for the first object are stored in a buffer.

The coordinates of the beginning and end points $P_1$, $P_2$ of the line elements are read from the buffer in step 32, the step width Δβ is determined for the respective line element, and the angle of observation β is set to the initial value $-_{parallax}$. The line element is transformed into the view plane in step 34, based on transformation matrices $T_{view}$, $T_{2d}$ as well as on the basis of transformation matrix $T^\beta_{parallax}$ for the respective value β, and thus a frame [partial image] of the line element is prepared for the initial angle β. This frame is then rastered in step 36 corresponding to the period of the lens array, i.e., the positions of the line-shaped frame elements E are calculated according to FIG. 10. In step 38, the calculated frame elements are either output onto a graphic output medium, for example, a printer, or are stored in an output file 42 for later use. Steps 34 and 36 are repeated recurrently around angle β increased stepwise by Δβ, until it is established in step 44 that angle β has reached the maximum value $\beta_{parallax}$.

After all frames of the line element have been prepared, it is tested in step 46 whether the buffer that has been filled in step 30 still contains further line elements. If this is the case, steps 32 to 46 are repeated for the next line element. If the last line element of the object has been processed, a return to step 18 is produced from step 46, and the data for the next object are read. If different data for the perspective display are stored in input file 20 for different objects, then the transformation matrices in step 26 can be modified prior to processing the next object.

If it is established in step 22 that the end of the input file has been reached, the program is terminated with step 16.

I claim:

1. Process for producing spatially effective images of three-dimensional objects on a two-dimensional image-reproduction medium according to the principle of parallax panoramagrams by means of a lens array, is hereby characterized in that a two-dimensional image of the object is calculated for a specific central view direction on the basis of stored data on the three-dimensional structure of the object, and that the positions of frame elements (E) of the panoramagram in the raster of the lens array are calculated for each image element of the calculated image for several directions of view that vary around the central direction of view and the frame elements are displayed at the calculated positions on the image-reproduction medium, wherein the number of frame elements produced for an image element is selected differently for different parts of the object.

2. Process according to claim 1, further characterized in that the view directions are varied stepwise around the central view direction within a uniform interval $[-\beta_{parallax}, +\beta_{parallax}]$ for the total object and that the step width Δβ of this variation is determined on the basis of the extent of the parallactic shift of the respective part of the object.

3. Process according to claim 1, further characterized in that the variation of view directions around the central view direction is limited to an interval $[-\beta_{parallax}, +\beta_{parallax}]$, which corresponds to the region of the deflection angle to the image normal line that is maximally obtainable with an individual lens of the lens array.

4. Process according to claim 1, further characterized in that an array of cylindrical lenses is used as the lens array.

5. Process according to claim 4, further characterized in that the object is presented by a sequence of straight line elements and that the frames for each line element and each view direction are calculated by dividing the line element corresponding to the cylindrical lenses covered by it, and a frame element is assigned to each segment in the form of a line running parallel to the cylindrical lens, whose position and length correspond in the direction parallel to the cylindrical lens to the projection of the corresponding segment onto the axis of the cylindrical lens, and whose position is determined in the direction perpendicular to the cylinder lens corresponding to the imaging properties of the cylindrical lens through the direction to the observer.

6. Process according to claim 5, further characterized in that the positions of the frame elements are calculated in the direction perpendicular to the cylindrical lenses with respect to an apparent period D of the lens array, which is given by the following formula:

$D=D_{cyl} \cdot (1+1/L)$ whereby $D_{cyl}$ is the actual width of the cylindrical lens, L is the basic distance of the observer from the plane of the image-reproduction medium and 1 is the thickness of the lens array essentially agreeing with the focal distance.

7. Process according to claim 1, further characterized in that the three-dimensional structure of the object is given by position vectors of points (P) of the object, that these position vectors are transformed into a Cartesian coordinate system (X''', Y''', Z'''), whose source lies in the assumed target point of view (A), onto which the glance of the observer is directed, whereby one axis (Z''') of the coordinate system corresponds to the central view direction, whereas the other two axes (X''', Y''') correspond to the height and width of the image-reproduction medium, and that the variations in the view direction are simulated by coordinate transformations, which correspond to rotations around the axis (X''') running in the direction of the height of the image-reproduction medium.

* * * * *